United States Patent
Baba et al.

(10) Patent No.: US 10,261,773 B2
(45) Date of Patent: Apr. 16, 2019

(54) INFORMATION PROCESSING DEVICE, INFORMATION PROCESSING METHOD, AND COMPUTER READABLE MEDIUM

(71) Applicant: MITSUBISHI ELECTRIC CORPORATION, Tokyo (JP)

(72) Inventors: Madoka Baba, Tokyo (JP); Daisuke Kawakami, Tokyo (JP); Yuta Atobe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/768,856

(22) PCT Filed: Dec. 10, 2015

(86) PCT No.: PCT/JP2015/084707
§ 371 (c)(1),
(2) Date: Apr. 17, 2018

(87) PCT Pub. No.: WO2017/098644
PCT Pub. Date: Jun. 15, 2017

(65) Prior Publication Data
US 2019/0056923 A1    Feb. 21, 2019

(51) Int. Cl.
*G06F 8/65* (2018.01)
*G06F 9/48* (2006.01)
*G06F 13/10* (2006.01)

(52) U.S. Cl.
CPC .............. *G06F 8/65* (2013.01); *G06F 9/4881* (2013.01); *G06F 13/102* (2013.01)

(58) Field of Classification Search
CPC ......... G06F 8/65; G06F 9/4881; G06F 13/102
See application file for complete search history.

(56) References Cited

U.S. PATENT DOCUMENTS

| | | | | |
|---|---|---|---|---|
| 4,123,795 A | * | 10/1978 | Dean, Jr. | G06F 9/4881 709/248 |
| 6,292,856 B1 | * | 9/2001 | Marcotte | G06F 13/102 710/263 |

(Continued)

FOREIGN PATENT DOCUMENTS

| | | |
|---|---|---|
| JP | 10-161891 A | 6/1998 |
| JP | 2006-90356 A | 4/2006 |
| JP | 2009-53920 A | 3/2009 |
| JP | 2010-27062 A | 2/2010 |

(Continued)

OTHER PUBLICATIONS

P. H. Seaman et al. "Simulating operating systems", [Online], 1969, pp. 264-279, [Retrieved from Internet on Dec. 26, 2018], <https://ieeexplore.ieee.org/stamp/stamp.jsp?tp=&arnumber=5388333>.*

(Continued)

*Primary Examiner* — Ziaul A Chowdhury
(74) *Attorney, Agent, or Firm* — Birch, Stewart, Kolasch & Birch, LLP

(57) ABSTRACT

A communication unit receives, from a terminal device, installed application information indicating an input/output schedule of input of input information to be used for computation by an installed application program installed in the terminal device and output of a result of computation by the installed application program. A determination unit analyzes the input/output schedule of the installed application program indicated by the installed application information and an input/output schedule of input of input information to be used for computation by a non-installed application program not yet installed in the terminal device and output of a result of computation by the non-installed application program, and determines whether or not the installed application program and the non-installed application program can be executed by the terminal device.

5 Claims, 19 Drawing Sheets

(56) References Cited

U.S. PATENT DOCUMENTS

| | | | |
|---|---|---|---|
| 6,792,476 B1* | 9/2004 | Iwatsu | G06F 13/102 348/316 |
| 7,197,577 B2* | 3/2007 | Nellitheertha | G06F 9/4881 710/1 |
| 7,387,258 B2* | 6/2008 | Potonniee | G06Q 20/3552 235/487 |
| 8,176,451 B2* | 5/2012 | Toi | G06F 17/505 703/16 |
| 9,032,399 B1* | 5/2015 | Yang | G06F 9/45558 718/1 |
| 2001/0032288 A1* | 10/2001 | Matsuura | G06F 8/65 711/103 |
| 2007/0250254 A1* | 10/2007 | Kimoto | G06F 8/65 701/114 |
| 2010/0043016 A1* | 2/2010 | Anzai | G06F 8/65 719/320 |
| 2013/0219381 A1* | 8/2013 | Lovitt | G06F 8/65 717/173 |
| 2017/0039091 A1 | 2/2017 | Fukuda et al. | |
| 2017/0293753 A1* | 10/2017 | Nagano | G06F 21/51 |
| 2017/0322791 A1* | 11/2017 | Tiles | G06F 8/65 |

FOREIGN PATENT DOCUMENTS

| | | | |
|---|---|---|---|
| JP | 2010-122752 A | | 6/2010 |
| JP | 2013-161242 A | | 8/2013 |
| JP | 2015-133077 A | | 7/2015 |
| WO | WO 2015/182295 A1 | | 12/2015 |

OTHER PUBLICATIONS

D. M. Ritchie, "A Stream Input-Output System", [Online], 1983, pp. 1897-1910, [Retrieved from Interent on Dec. 26, 2018], <https://ieeexplore.ieee.org/stamp/stamp.jsp?arnumber=6771925>.*

J. C. Yoon, J. Choi et al., "Improvement of RF Ccontrol System for the 20 MEV Proton LINAC of PEFP", [Online], 2005, pp. 3100-3102, [Retrieved from Internet on Dec. 26, 2018], <http://epaper.kek.jp/p05/PAPERS/FPAT050.pdf>.*

Chi Chung Ko et al., "A Web-Based Virtual Laboratory on a Frequency Modulation Experiment", [Online], 2001, pp. 295-303, [Retrieved from Interent on Dec. 26, 2018], <https://ieeexplore.ieee.org/stamp/stamp.jsp?arnumber=971657>.*

International Search Report (PCT/ISA/210) issued in PCT/JP2015/084707, dated Mar. 8, 2016.

* cited by examiner

Fig. 4

|  | PRIORITY LEVEL | STARTUP CYCLE | STARTUP OFFSET | EXECUTION TIME |
|---|---|---|---|---|
| APPLICATION A | 2 | tCycle | t1 | tA |
| APPLICATION B | 1 | tCycle | t1 | tB |
| INPUT CONTROL UNIT | 3 | tCycle | t0 | — |
| OUTPUT CONTROL UNIT | 3 | tCycle | t0 | — |

Fig. 5

|  | TIMING | APPLICATION | DEVICE | DIRECTION |
|---|---|---|---|---|
| INPUT INFORMATION A | t0 | APPLICATION A | SENSOR A | 1 |
| INPUT INFORMATION B | t0 | APPLICATION A | SENSOR B | 1 |
| INPUT INFORMATION C | t0 | APPLICATION B | SENSOR C | 1 |
| INPUT INFORMATION D | — | — | SENSOR D | 1 |
| CONTROL INFORMATION A | t0 | APPLICATION A | ACTUATOR A | 0 |
| CONTROL INFORMATION B | t0 | APPLICATION B | ACTUATOR B | 0 |

Fig. 8

| | PRIORITY LEVEL | STARTUP CYCLE | STARTUP OFFSET | EXECUTION TIME |
|---|---|---|---|---|
| APPLICATION A | 2 | tCycle | t1 | tA |
| APPLICATION B | 1 | tCycle | t1 | tB |
| INPUT CONTROL UNIT | 3 | tCycle | t0 | — |
| OUTPUT CONTROL UNIT | 3 | tCycle | t0 | — |

Fig. 9

| | TIMING | APPLICATION | DEVICE | DIRECTION |
|---|---|---|---|---|
| INPUT INFORMATION A | t0 | APPLICATION A | SENSOR A | I |
| INPUT INFORMATION A | t0 | APPLICATION A | SENSOR A | I |
| INPUT INFORMATION C | t0 | APPLICATION B | SENSOR C | I |
| INPUT INFORMATION D | — | — | SENSOR D | I |
| CONTROL INFORMATION A | t0 | APPLICATION A | ACTUATOR A | O |
| CONTROL INFORMATION B | t0 | APPLICATION B | ACTUATOR B | O |

Fig. 10

| | TIMING | APPLICATION | DEVICE | DIRECTION |
|---|---|---|---|---|
| INPUT INFORMATION A | t0 | APPLICATION C | SENSOR A | I |
| INPUT INFORMATION B | t0 | APPLICATION C | SENSOR B | I |
| INPUT INFORMATION C | t0 | APPLICATION B | SENSOR C | I |
| INPUT INFORMATION D | t0 | APPLICATION C | SENSOR D | I |
| CONTROL INFORMATION A | t0 | APPLICATION C | ACTUATOR A | O |
| CONTROL INFORMATION B | t0 | APPLICATION B | ACTUATOR B | O |

Fig. 12

| | PRIORITY LEVEL | STARTUP PERIOD | STARTUP OFFSET | EXECUTION TIME |
|---|---|---|---|---|
| APPLICATION A | 2 | tCycle | t1 | tA |
| APPLICATION B | 1 | tCycle | t1 | tB |
| INPUT CONTROL UNIT | 3 | tCycle/3 | t0 | — |
| OUTPUT CONTROL UNIT | 3 | tCycle/3 | t0 | — |

Fig. 16

| | TIMING | APPLICATION | DEVICE | DIRECTION |
|---|---|---|---|---|
| INPUT INFORMATION A | t0 | APPLICATION A | SENSOR A | I |
| INPUT INFORMATION B | t0 | APPLICATION A | SENSOR B | I |
| INPUT INFORMATION C | t0 | APPLICATION B | SENSOR C | I |
| INPUT INFORMATION D | — | — | SENSOR D | I |
| CONTROL INFORMATION A | t0 | APPLICATION A | ACTUATOR A | 0 |
| CONTROL INFORMATION B | t0 | APPLICATION B | ACTUATOR B | 0 |
| CONTROL INFORMATION C | — | — | ACTUATOR C | 0 |

Fig. 18

|  | PRIORITY LEVEL | STARTUP CYCLE | STARTUP OFFSET | EXECUTION TIME |
|---|---|---|---|---|
| APPLICATION A | 2 | tCycle | t1 | tA' |
| APPLICATION B | 1 | tCycle | t1 | tB |
| INPUT CONTROL UNIT | 3 | tCycle | t0 | — |
| OUTPUT CONTROL UNIT | 3 | tCycle | t0 | — |

INFORMATION PROCESSING DEVICE, INFORMATION PROCESSING METHOD, AND COMPUTER READABLE MEDIUM

TECHNICAL FIELD

The present invention relates to update of application programs (hereinafter may simply referred to as applications).

Update of applications to be executed by an on-vehicle electronic control device (hereinafter referred to as an engine control unit: ECU) will be described below.

BACKGROUND ART

Automobiles have ECUs mounted thereon for performing control of engine ignition timings and steering motors. Conventionally, an ECU (hereinafter referred to as a control system ECU) that performs safety critical control relating to acceleration, steering, and braking is connected only with an on-vehicle network but separated from external networks. In addition, update of applications mounted on such control system ECUs is not performed routinely, but update of applications is performed by dealers in service campaigns or in the event of recall.

From now on, however, an on-vehicle network with which a control system ECU is connected will be connected with external networks and applications for the control system ECU will be rewritten via radio communication from a cloud network for the purpose of reduction in dealers' cost or the like. Furthermore, applications for implementing drive assisting functions at various levels provided by a safety drive assisting system and an automatic cruise system and applications for implementing functions associated with the driver's taste have been demanded for the control system ECUs. Thus, similarly to adding applications to smart phones, it is expected that overwriting, addition, and deletion (hereinafter, overwriting, addition, and deletion will be collectively referred to as update) of applications for the control system ECU due to improvement or upgrade of the applications will be performed through a cloud network after purchase of a car.

In update of an application at the control system ECU, it is necessary to not only make sure that existing applications operate normally and that new applications can be executed at predetermined timings, but also consider whether or not timings of data input from sensors used by respective applications and timings of control of actuators can be achieved with the applications. When such data input timings and control timings are satisfied, control intended by the developers of applications can be achieved even after the applications are updated.

In conventional control system ECUs, application installation patterns are only present depending on destinations and options, and the number of the application installation patterns is limited. Thus, in performing update of an application, all the installation patterns in the control system ECUs to be updated can be covered for verification including the aforementioned timings and the like and determination on whether or not the update is allowed for every development of a new application.

When, however, the control system ECUs tend to be customized in response to various demands after shipment as described above, the number of installation patterns that need to be verified will be enormous. In addition, car manufacturers and developers of new applications do not always cover all the applications already installed in the control system ECUs to be updated. If a control system ECU including such an unknown application, that is, a control system ECU having an installation pattern that cannot be verified at the application development stage is updated with a new application, the control system ECU may become in an abnormal state, which may disable control of the vehicle, cause the car to become immobile or cause an accident. It is therefore necessary to individually determine whether or not update of an application in the control system ECU to be updated is allowed before updating the application.

Patent Literature 1, for example, discloses a method for determining whether or not update of an application is allowed in view of a deadline of the application, a processing time of the application, and a communication time between the control system ECUs.

CITATION LIST

Patent Literature

Patent Literature 1: JP 2010-027062 A

SUMMARY OF INVENTION

Technical Problem

In Patent Literature 1, however, timings at which data are input from sensors and timings at which actuators are controlled are not considered, the sensors and the actuators being used by applications already installed in the control system ECU or new applications. Thus, depending on the content of update, old data from sensors at approximately one cycle earlier than desired timings may be used for computation of the application, or control delayed by approximately one cycle from desired timings may be performed. In such cases, there is a problem that control of a vehicle expected during development of an application cannot be performed.

A major object of the present invention is to solve such problems as described above. The present invention mainly aims to make input information to an application program be input at a proper timing and a result of computation by the application program be output at a proper timing even after update of the application program.

Solution to Problem

An information processing device according to the present invention, includes:

a communication unit to receive, from a terminal device, installed application information indicating an input/output schedule of input of input information to be used for computation by an installed application program installed in the terminal device and output of a result of computation by the installed application program; and a determination unit to analyze the input/output schedule of the installed application program indicated by the installed application information and an input/output schedule of input of input information to be used for computation by a non-installed application program not yet installed in the terminal device and output of a result of computation by the non-installed application program, and determine whether or not the installed application program and the non-installed application program can be executed by the terminal device.

Advantageous Effects of Invention

In the present invention, an input/output schedule of an installed application program and an input/output schedule of a non-installed application program are analyzed, and whether or not the installed application program and the non-installed application program can be executed by the terminal device is determined. Thus, according to the present invention, input information to an application program is input at a proper timing and a result of computation by the application program is output at a proper timing at the terminal device even after the application program is updated.

BRIEF DESCRIPTION OF DRAWINGS

FIG. 4 illustrates examples of a startup condition and an execution time at the ECU according to the first embodiment.

FIG. 5 is a table illustrating an example of a parameter table according to the first embodiment.

FIG. 8 is a table illustrating an example of a startup condition and an execution time at the ECU (after information associated with an application A is deleted) according to the first embodiment.

FIG. 9 is a table illustrating an example of a parameter table (after information associated with the application A is deleted) according to the first embodiment.

FIG. 10 is a table illustrating an example of a parameter table after merging according to the first embodiment.

FIG. 12 is a table illustrating examples of a startup condition and an execution time according to a second embodiment.

FIG. 16 is a table illustrating an example of a parameter table according to the third embodiment.

FIG. 18 is a table illustrating examples of a startup condition and an execution time after update according to the third embodiment.

DESCRIPTION OF EMBODIMENTS

First Embodiment

A vehicle network system according to a first embodiment will now be described.

More specifically, a vehicle network system that determines whether or not to update an application in view of the timings at which data are input from sensors and the timings for controlling actuators, the sensors and the actuators being used by applications already installed in a control system ECU or new applications, in addition to deadlines and processing times of the applications will be described. The vehicle network system according to the present embodiment allows advanced control even after application update.

*Description of Configuration*

Figure 1:
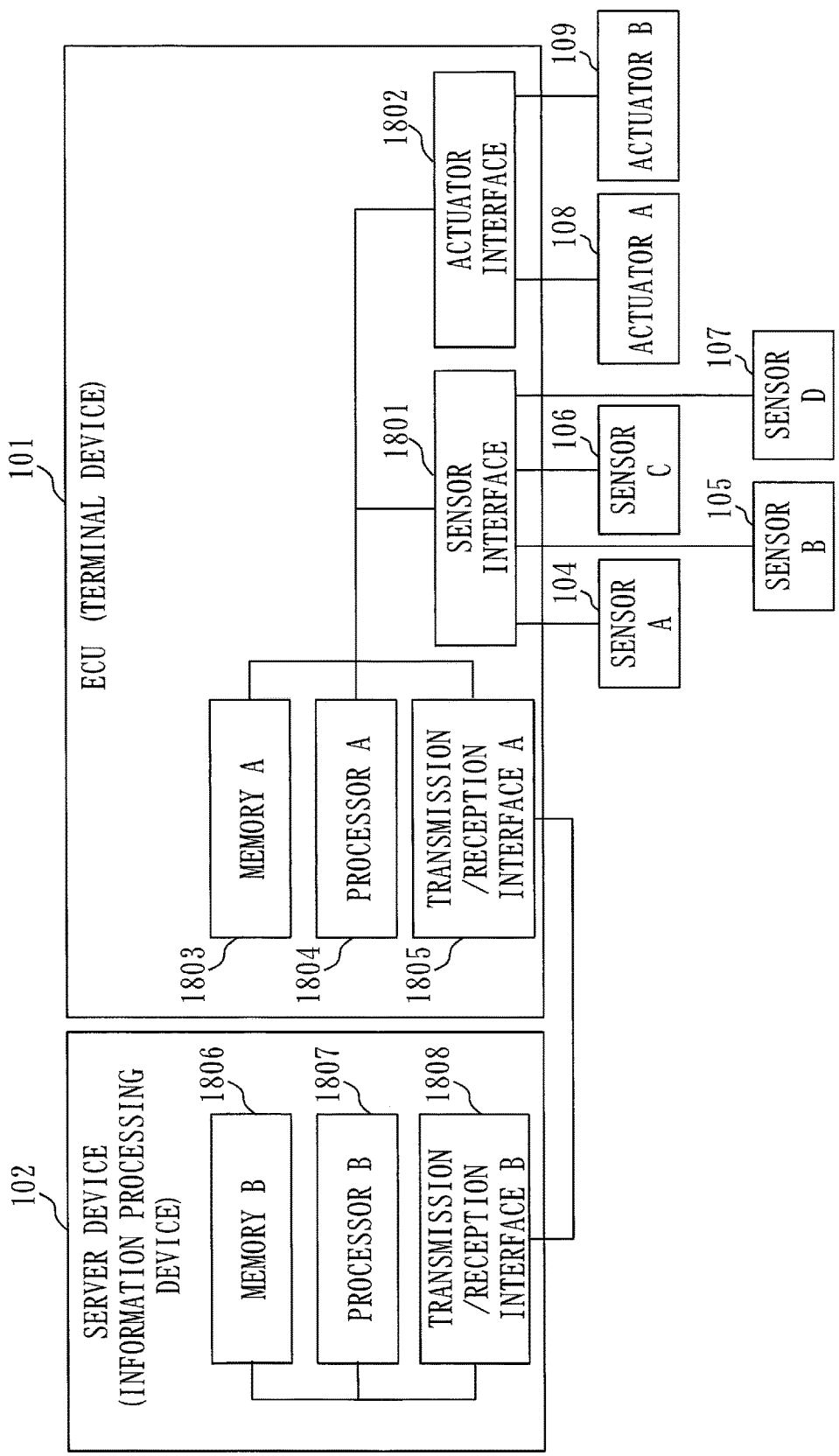
FIG. 1 is a diagram illustrating an example hardware configuration of a vehicle network system according to a first embodiment.

FIG. 1 is a diagram illustrating an example hardware configuration of a vehicle network system according to the present embodiment.

The vehicle network system is constituted by an ECU 101 and a server device 102. The ECU 101 and the server device 102 are connected with each other via a radio communication network 103. The ECU 101 is mounted on a vehicle, and the server device 102 is located outside of the vehicle. The ECU 101 and the server device 102 are computers.

The ECU 101 is connected with six devices, which are a sensor A 104, a sensor B 105, a sensor C 106, a sensor D 107, an actuator A 108, and an actuator B 109. The ECU 101 includes, as hardware, a sensor interface 1801, an actuator interface 1802, a memory A 1803, a processor A 1804, and a transmission/reception interface A 1805. The sensor interface 1801 is an interface for acquiring signals from the sensor A 104 to the sensor D 107. The actuator interface 1802 is an interface for controlling the actuator A 108 and the actuator B 109. The memory A 1803 stores various data and programs. The processor A 1804 executes the programs stored in the memory A 1803. The transmission/reception interface A 1805 is an interface for performing communication via the radio communication network 103.

The server device 102 includes, as hardware, a memory B 1806, a processor B 1807, and a transmission/reception interface B 1808.

The memory B 1806 stores various data and programs. The processor B 1807 executes the programs stored in the memory B 1806. The transmission/reception interface B 1808 is an interface for performing communication via the radio communication network 103.

Note that the ECU 101 corresponds to an example of a terminal device, and the server device 102 corresponds to an example of an information processing device.

Figure 2:
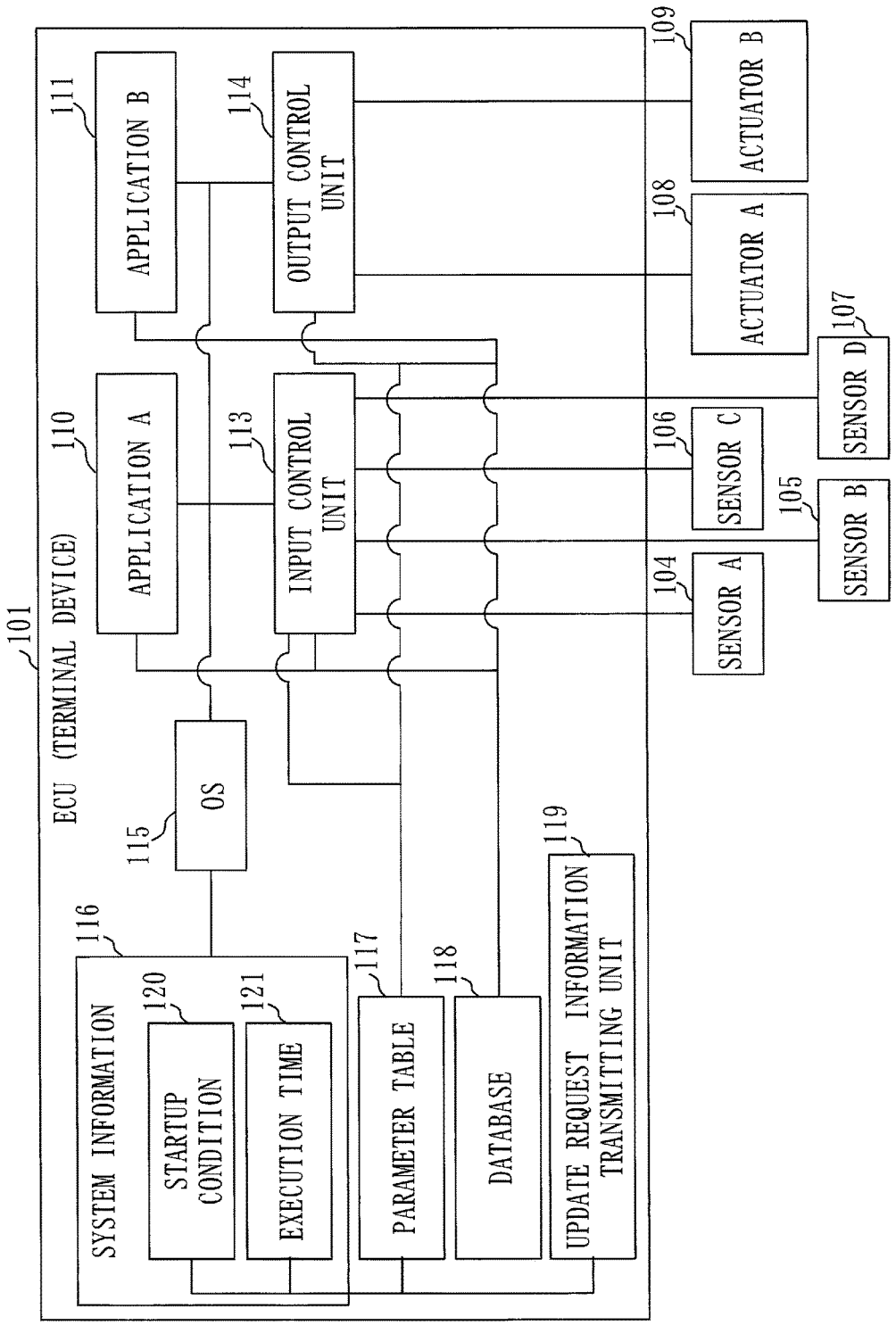
FIG. 2 is a diagram illustrating an example functional configuration of an ECU according to the first embodiment.

FIG. 2 illustrates an example functional configuration of the ECU 101.

An application A 110 an application B 111, an input control unit 113, an output control unit 114, an operating system (OS) 115, and an update request information transmitting unit 119 are realized by programs. These programs are stored in the memory A 1803, and read and executed by the processor A 1804.

In addition, a parameter table 117, a database 118, a startup condition 120, and an execution time 121 are information stored in the memory A 1803. The startup condition 120 and the execution time 121 are collectively referred to as system information 116.

The input control unit 113 and the output control unit 114, when executed by the processor A 1804, accesses the sensor interface 1801 and the actuator interface 1802 depending on the content of execution. More specifically the input control unit 113 acquires values from the sensor A 104 to the sensor D 107 via the sensor interface 1801. The output control unit 114 controls the actuator A 108 and the actuator B 109 via the actuator interface 1802 by using control information.

The update request information transmitting unit 119, when executed by the processor A 1804, accesses the transmission/reception interface A 1805 to communicate with the server device 102 depending on the content of execution.

Figure 3:
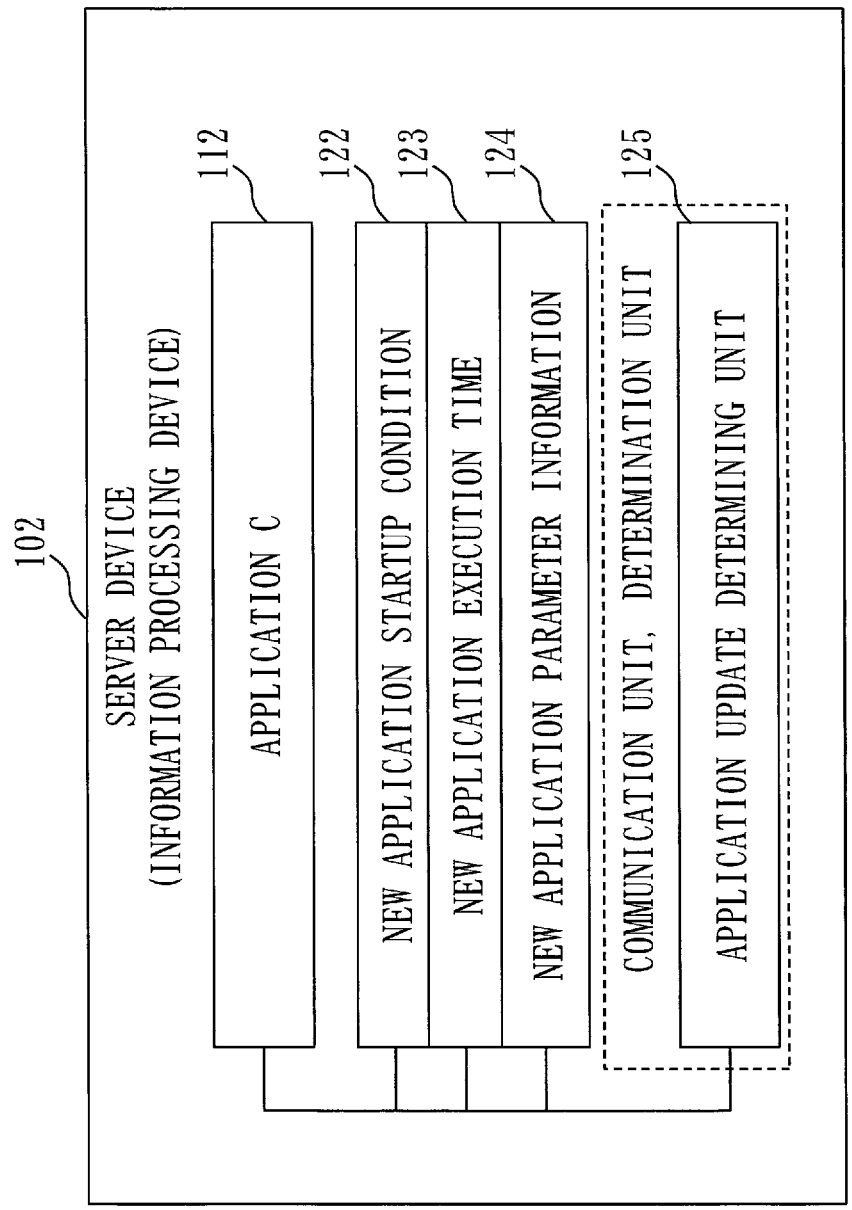
FIG. 3 is a diagram illustrating an example functional configuration of a server device according to the first embodiment.

FIG. 3 illustrates an example functional configuration of the server device 102.

An application update determining unit 125 is realized by programs. The programs for implementing the application update determining unit 125 are stored in the memory B 1806, and read and executed by the processor B 1807. The application update determining unit 125, when executed by the processor B 1807, accesses the transmission/reception interface B 1808 to communicate with the ECU 101 depending on the content of execution. In addition, the application update determining unit 125 when executed by the processor B 1807, determines whether or not the ECU 101 can execute an application C 112. The application update determining unit 125 corresponds to an example of a communication unit and a determination unit. In addition, the operation performed by the application update determining unit 125 corresponds to an example of a reception process and a determination process.

The application C 112, a new application startup condition 122, a new application execution time 123, a new application parameter information 124 are information stored in the memory B 1806.

The application C 112, after being downloaded to the ECU 101, is stored in the memory A 1803, and read and executed by the processor A 1084, similarly to other applications.

*Description of Operation*

Next, an outline of operation of the ECU 101 will be described.

As illustrated in FIG. 2, the application A 110 and the application B 111 are already installed in the ECU 101. The application A 110 and the application B 111 correspond to examples of an installed application program.

The application A 110 and the application B 111 perform computation on the basis of data of input information A to input information D from the sensor A 104 to the sensor D 107 to generate control information A and control information B. The input information A to the input information D are data to be used for computation by the application A 110 and the application B 111. The control information A and the control information B are results of computation by the application A 110 and the application B 111.

The ECU 101 controls the actuator A 108 and the actuator B 109 by using the control information A and the control information B, to control the vehicle.

In addition, the ECU 101 downloads a new application C 112 from the server device 102 to extend the functions of the application A 110 and the application B 111 or add a new different function to achieve vehicle control to the driver's taste.

Next, the functions of the ECU 101 will be described.

The application A 110, when started, performs computation by using the input information A and the input information B stored in the database 118, calculates the control information A, and stores the control information A into the database 118.

The application B 111, when started, performs computation by using the input information C stored in the database 118, calculates the control information B, and stores the control information B in the database 118.

The input control unit 113, when started, acquires the input information A to the input information D from the sensor A 104 to the sensor D 107 at predetermining input timings, and writes the acquired input information A to input information D into the database 118.

The input information A to the input information D are used for computation by the application A 110 and the application B 111.

The output control unit 114, when started, controls the actuator A 108 and the actuator B 109 by using the control information A and the control information B, respectively, stored in the database 118 at predetermined output timings.

The result of computation by the application A 110 is indicated by the control information A, and the result of computation by the application B 111 is indicated by the control information B. As a result of controlling the actuator A 108 by the output control unit 114 using the control information A, the result of computation by the application A 110 is output to the actuator A 108. In addition, as a result of controlling the actuator B 109 by the output control unit 114 using the control information B, the result of computation by the application B 111 is output to the actuator B 109.

The OS 115 starts the application A 110, the application B 111, the input control unit 113, and the output control unit 114 according to the startup condition 120. Note that, in the first embodiment, the OS 115 sequentially executes the output control unit 114 and the input control unit 113 in this order in a time frame in which the input control unit 113 and the output control unit 114 can be executed. After the time frame in which the input control unit 113 and the output control unit 114 can be executed has elapsed, the OS 115 executes the application A 110 and the application B 111.

As described above, the system information 116 includes the startup condition 120 and the execution time 121.

The execution time 121 is a maximum value of the length of execution time (a worst execution time) measured or estimated by the developer during design. The execution time 121 is defined for each of the application A 110 and the application B 111.

The startup condition 120 is defined for each of the application A 110, the application B 111, the input control unit 113, and the output control unit 114.

The startup condition 120 is constituted by a priority level, a startup cycle, and a startup offset.

FIG. 4 illustrates an example of the system information 116.

The priority levels of the application A 110, the application B 111, the input control unit 113, and the output control unit 114 are 2, 1, 3, and 3, respectively. Note that the priority level is higher as the value is larger. The startup cycles are all the same time tCycle. The startup offsets of the application A 110, the application B 111, the input control unit 113, and the output control unit 114 are times t1, t1, t0, and t0, respectively. A startup offset refers to an offset from start time of each cycle of a global cycle period (time tCycle herein). The execution times 121 (worst execution times) of the application A 110 and the application B 111 are times tA and tB, respectively.

The system information 116 defines execution schedules of the application A 110 and the application B 111 at the ECU 101. More specifically, the system information 116 defines an execution schedule in which execution of the application A 110 with a high priority level is started at time t1 and the execution of the application A 110 continues for up to a time tA. Furthermore, the system information 116 defines an execution schedule in which execution of the application B 111 with a low priority level is started after completion of the execution of the application A 110, and the execution of the application B ill continues for up to time tB.

The parameter table 117 describes attributes of input information and attributes of control information.

Input information is associated with a device, a direction, an input timing, and an application using the input information as attributes. In addition, control information is associated with a device, a direction, an output timing, and an application using the control information as attributes.

An example of the parameter table 117 is illustrated in FIG. 5.

The input/output timings of the input information A to the input information C, the control information A, and the control information B are all time t0. This value also refers to a time offset from start time of each cycle, similarly to the startup offset. The input timing is not set for the input information D since no application uses the input information D. The input information A, the input information B, and the control information A are associated with the application A 110, and the input information C and the control information B are associated with the application B 111. In addition, the input information A to the input information D are associated with the sensor A 104 to the sensor D 107, respectively, and the associated direction is an input direction. The control information A is associated with the actuator A 108, the control information B is associated with the actuator B 109, and the associated direction is an output direction. While one application is associated with each piece of the information herein, one line may be added and the application B 111 may be associated with the same input information A at time t0, which is the same timing, or at a different timing, for example.

The parameter table 117 defines input/output schedules. More specifically, the parameter table 117 defines an input/output schedule in which the input information A to the input information D are input at time t0, and the computation results indicated by the control information A and the control information B are output at time t0.

The database 118 stores the input information A to the input information D acquired from the sensor A 104 to the sensor D 107 and the control information A and the control information B for controlling the actuator A 108 and the actuator B 109.

The update request information transmitting unit 119 transmits the parameter table 117, the system information 116 (the startup condition 120 and the execution time 121), a name of application to be updated, and the type of update (overwriting, addition, or deletion) as update request information to the server device 102.

The timing for transmitting the update request information is at a point when the application A 110 receives information indicating that an application C 112 for update is available from outside and requests the update request information transmitting unit 119 to acquire the application C 112 for update, for example. Since processing relating to generation of an update request is not included in the present invention, detailed description thereof will not be provided.

As described above, the update request information includes the parameter table 117 indicating the input/output schedules of the application A 110 and the application B 111, and the system information 116 indicating the execution schedules of the application A 110 and the application B 111, and corresponds to an example of installed application information.

As illustrated in FIG. 3, the server device 102 includes the application C 112, the new application startup condition 122, the new application execution time 123, the new application parameter information 124, and the application update determining unit 125.

The application C 112 is an advance application with extended functions of the application A 110, which is developed for execution at the ECU 101. Thus, for installation of the application C 112 in the ECU 101, the application A 110 is updated by being overwritten. The application C 112, when started at the ECU 101, performs computation by using the input information A, the input information B, and the input information D stored in the database 118 to calculate the control information A. The control information A is stored into the database 118.

The application C 112 is an application program that has not been installed yet in the ECU 101, and corresponds to an example of a non-installed application program.

The new application startup condition 122 is information to be used as the startup condition 120 by the OS 115 in the case where the application C 112 is executed by the ECU 101. Herein, the priority level, the startup cycle, and the startup offset are assumed to be the same as those of the application A 110.

The new application execution time 123 is an estimated value of the worst execution time in the case where the application C 112 is executed by the ECU 101. Herein, the new application execution time 123 is a time tC, which is longer than the execution time t0 of the application A 110.

The new application startup condition 122 and the new application execution time 123 serve similarly to the system information 116 in the ECU 101. Specifically, the new application startup condition 122 and the new application execution time 123 define an execution schedule of the application C 112. More specifically, the new application startup condition 122 and the new application execution time 123 define an execution schedule in which execution of the application C 112 is started at time t1 and the execution of the application C 112 continues for up to the time tC.

The new application parameter information 124 is information specifying the input timings of the input information A, the input information B, and the input information D to be used by the application C 112, the output timing of the control information A, the respective devices and the respective directions. It is guaranteed that normal vehicle control will be made by the application C 112 when input and output are performed at the input timings and the output timings specified by the new application parameter information 124. It is assumed herein that the input timings and the output timings are set to time t0.

As described above, the new application parameter information 124 defines the input/output schedule of the application C 112. More specifically, the new application parameter information 124 defines the input/output schedule in which the input information A, the input information B, and the input information D are input at time t0, and the control information A is output at time t0.

The application update determining unit 125 receives an update request information, which is installed application information, from the update request information transmitting unit 119 of the ECU 101 by using the transmission/reception interface B 1808.

Furthermore, the application update determining unit 125 determines whether or not the ECU 101 can be updated with the application C 112 on the basis of the update request information, the new application startup condition 122, the new application execution time 123, and the new application parameter information 124.

More specifically, the application update determining unit 125 analyzes the input/output schedule of the application B 111 indicated by the update request information, and the input/output schedule of the application C 112 defined by the new application parameter information 124. Thus, the application update determining unit 125 analyzes whether or not the input of the input information of the application C 112 and the output of the computation result of the application C 112 will be performed according to the input/output schedule of the application C 112 if the application C 112 is installed in the ECU 101 and input of the input information of the application B 111 and output of a computation result of the application B 111 are performed according to the input/output schedule of the application B 111. Furthermore, the application update determining unit 125 analyzes the execution schedule of the application B 111 indicated by the update request information, and the execution schedule of the application C 112 defined by the new application startup condition 122 and the new application execution time 123. Thus, the application update determining unit 125 analyzes whether or not the execution of the application B 111 and the execution of the application C 112 will be completed within a predetermined time frame (that is, within the startup cycle tCycle) if the application C 112 is installed in the ECU 101, the application B 111 is executed according to the execution schedule of the application B 111, and the application C 112 is executed according to the execution schedule of the application C 112.

The application update determining unit 125 then determines that the application B 111 and the application C 112 can be executed by the ECU 101 and that the ECU 101 can be updated with the application C 112 when the input of the input information of the application C 112 and the output of the computation result of the application C 112 are performed according to the input/output schedule of the application C 112, and the execution of the application B 111 and the execution of the application C 112 are completed within the time frame (within the startup cycle tCycle).

In addition, when the application update determining unit 125 has determined that the application B 111 and the application C 112 can be executed by the ECU 101 and that the ECU 101 can be updated with the application C 112, the application update determining unit 125 transmits the application C 112 to the ECU 101 by using the transmission/reception interface B 1808. The application update determining unit 125 also transmits information illustrated in FIG. 10 to the ECU 101.

Figure 6:
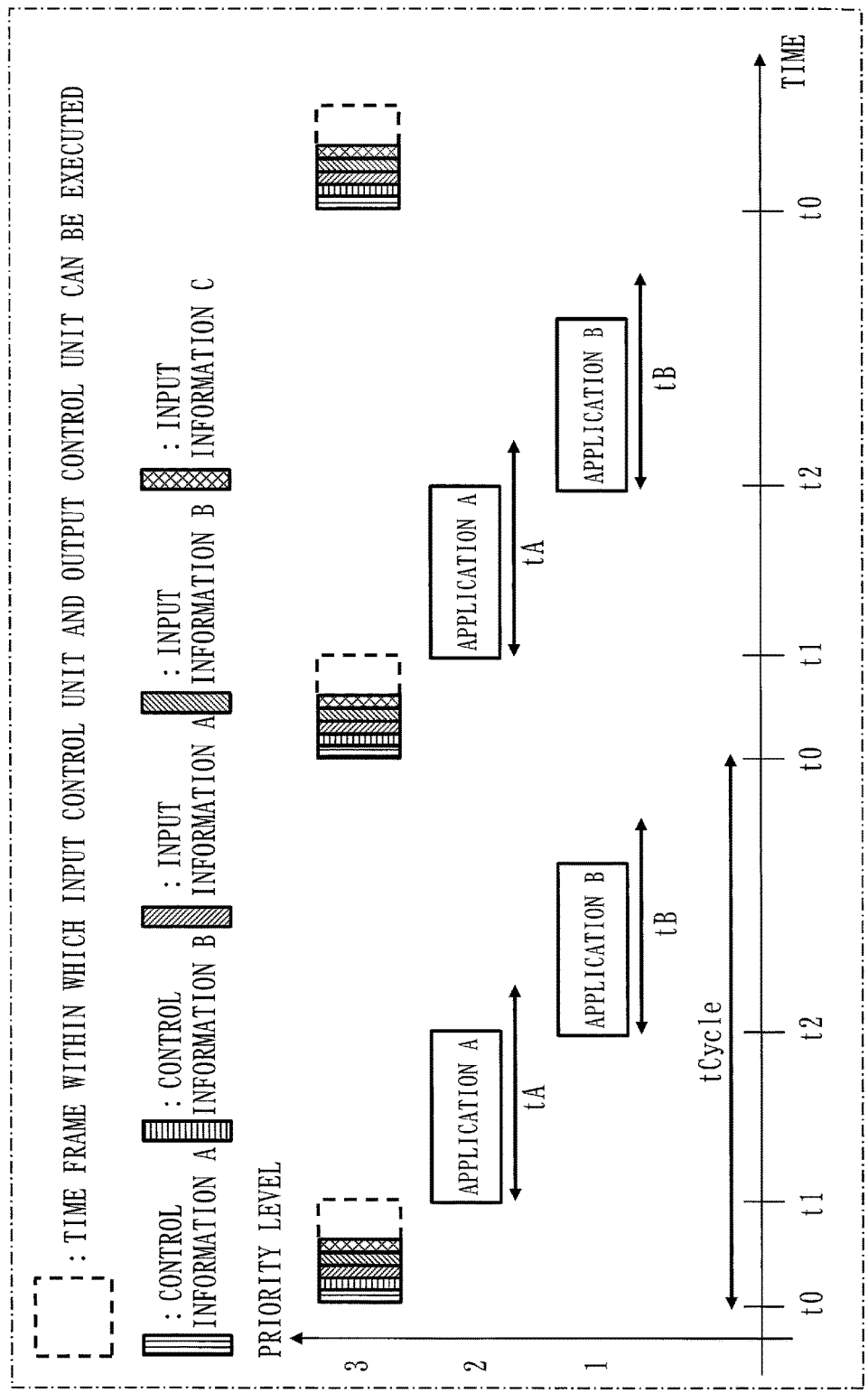
FIG. 6 is a timing chart before update with an application C according to the first embodiment.

Next, the operation of the ECU 101 before the ECU 101 is updated with the application C 112 will be described with reference to a timing chart in FIG. 6.

At time t0, the OS 115 starts the output control unit 114 on the basis of the startup condition 120. The output control unit 114 refers to the parameter table 117 to check out the presence of the control information A and the control information B in the output direction at the timing of time t0. Thus, the output control unit 114 acquires the control information A and the control information B from the database 118. Furthermore, the output control unit 114 control the actuator A 108, which is an associated device written in the parameter table 117, by using the value of the control information A, and controls the actuator B 109, which is an associated device written in the parameter table 117, by using the value of the control information B.

After the processing of the output control unit 114 is completed, the OS 115 subsequently starts the input control unit 113. The input control unit 113 refers to the parameter table 117 to check out the presence of the input information A to the input information C in the input direction at the timing of time t0. Thus, the input control unit 113 accesses the sensor A 104 to the sensor C 106 to acquire the input information A to the input information C. The input control unit 113 further stores the input information A to the input information C into the database 118.

The processing of the input control unit 113 is completed here.

Subsequently, at time t1, the OS 115 starts the application A 110 on the basis of the startup condition 120. The startup offsets of the application A 110 and the application B 111 are the same time t1, but the application A 110 with a high priority level is started first.

The application A 110 performs computation by using the input information A and the input information B stored in the database 118, calculates the control information A, stores the control information A into the database 118, and terminates the processing.

After the processing of the application A 110 is completed at time t2, the OS 115 starts the application B 111.

The application B 111 performs computation by using the input information C stored in the database 118, calculates the control information B, stores the control information B into the database 118, and terminates the processing.

Then, after the startup cycle tCycle has elapsed from time t0, the time is reset to t0, the output control unit 114 is started again on the basis of the startup condition 120, and the same processing is repeated subsequently.

Next, processing performed when the application update determining unit 125 of the server device 102 has received update request information from the update request information transmitting unit 119 of the ECU 101 will be described with reference to a flowchart of FIG. 7.

Figure 7:
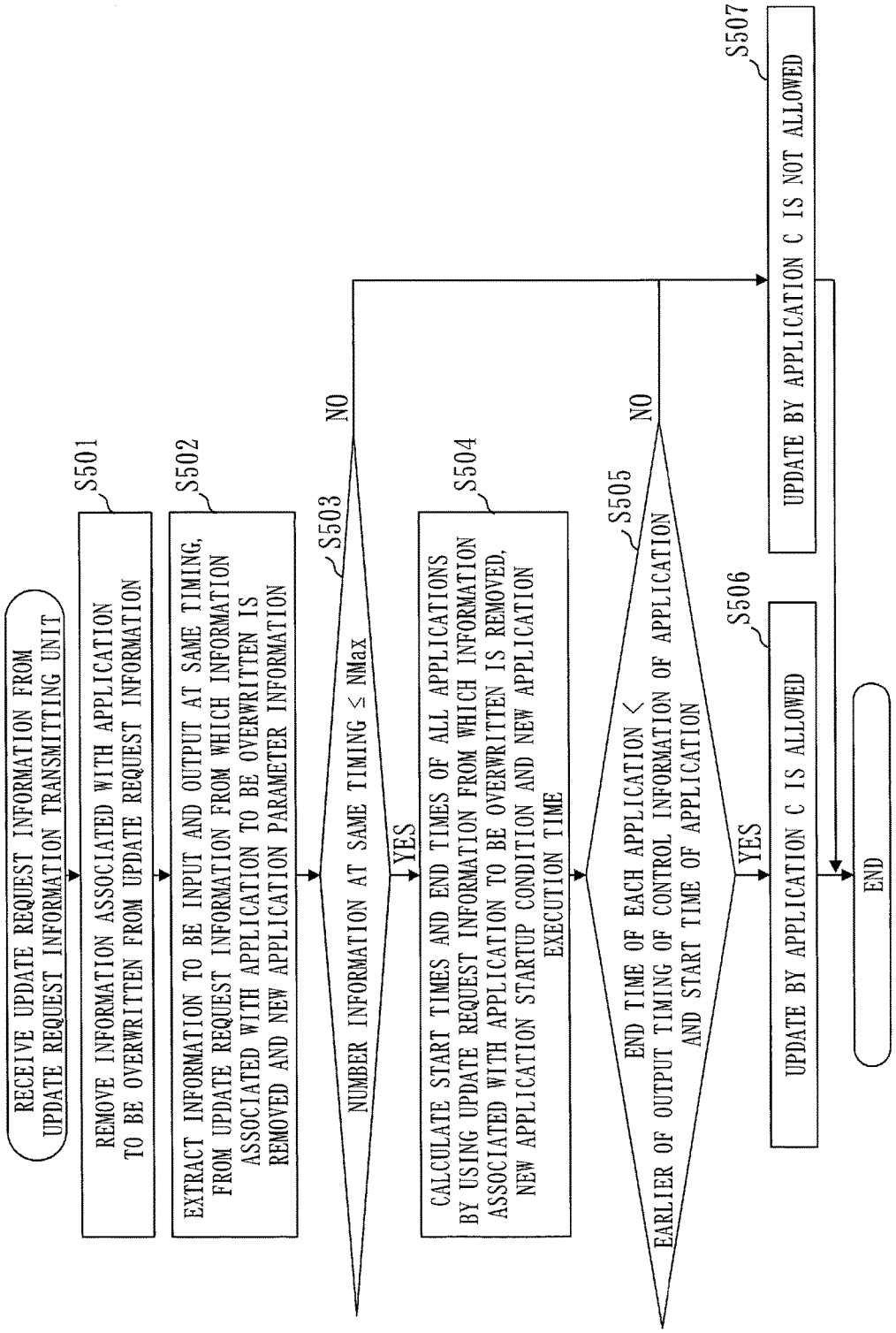
FIG. 7 is a flowchart illustrating example operation of the server device according to the first embodiment.

Note that operation procedures illustrated in FIG. 7 correspond to examples of an information processing method and an information processing program.

The application update determining unit 125 deletes items associated with an application to be overwritten from the update request information received from the ECU 101 (step S501).

Subsequently, the application update determining unit 125 extracts values set as the timings of the input information and the control information subjected to the deletion in the parameter table 117 and values set as the timings of the input information and the control information of the new application parameter information 124 (step S502).

Subsequently, the application update determining unit 125 determines whether or not the number of pieces of input information or control information at the same timing is equal to or less than NMax (step S503).

In step S503, the application update determining unit 125 determines whether or not the input of the input information of the application C 112 and the output of the computation result of the application C 112 will be performed according to the input/output schedule of the application C 112 if the application C 112 is installed in the ECU 101 and input of the input information of the application B 111 and output of a computation result of the application B 111 are performed according to the input/output schedule of the application B 111.

If the number of pieces of input information and control information at the same timing is equal to or less than NMax in step S503, the application update determining unit 125 calculates start time and end time of each application by using information of the startup condition 120 and the execution time 121 of the ECU 101 subjected to the deletion, information of the new application startup condition 122 and the new application execution time 123, and each piece of parameter information (step S504).

Subsequently, the application update determining unit 125 determines whether or not the end time of each application is earlier than either of the output timing of the control information to be output by the application and the next start time of the application itself (step S505).

In steps S504 and S505, the application update determining unit 125 determines whether or not the execution of the application B 111 and the execution of the application C 112 will be completed within a predetermined time frame when the application C 112 is installed in the ECU 101, the application B 111 is executed according to the execution schedule of the application B 111, and the application C 112 is executed according to the execution schedule of the application C 112.

If the end time of the application is earlier in step S505, the application update determining unit 125 determines that update of the ECU 101 with the new application C 112 is allowed (step S506), and terminates the processing.

If the number of pieces of input information or control information of the same timing exceeds NMax, or if the end time of the application is later, the application update determining unit 125 determines that update of the ECU 101 with the new application C 112 is not allowed (step S507), and terminates the processing.

Next, a determination process performed by the application update determining unit 125 when the ECU 101 has transmitted update request information to the server device 102 for the purpose of updating the application A 110 by overwriting with the application C 112 will be described.

Upon receiving the information illustrated in FIGS. 4 and 5 as the update request information from the ECU 101, the application update determining unit 125, deletes information associated with the application A 110 to be overwritten. As a result, the update request information becomes as illustrated in FIGS. 8 and 9. In FIGS. 8 and 9, hatched lines are deleted lines.

Figure 11:
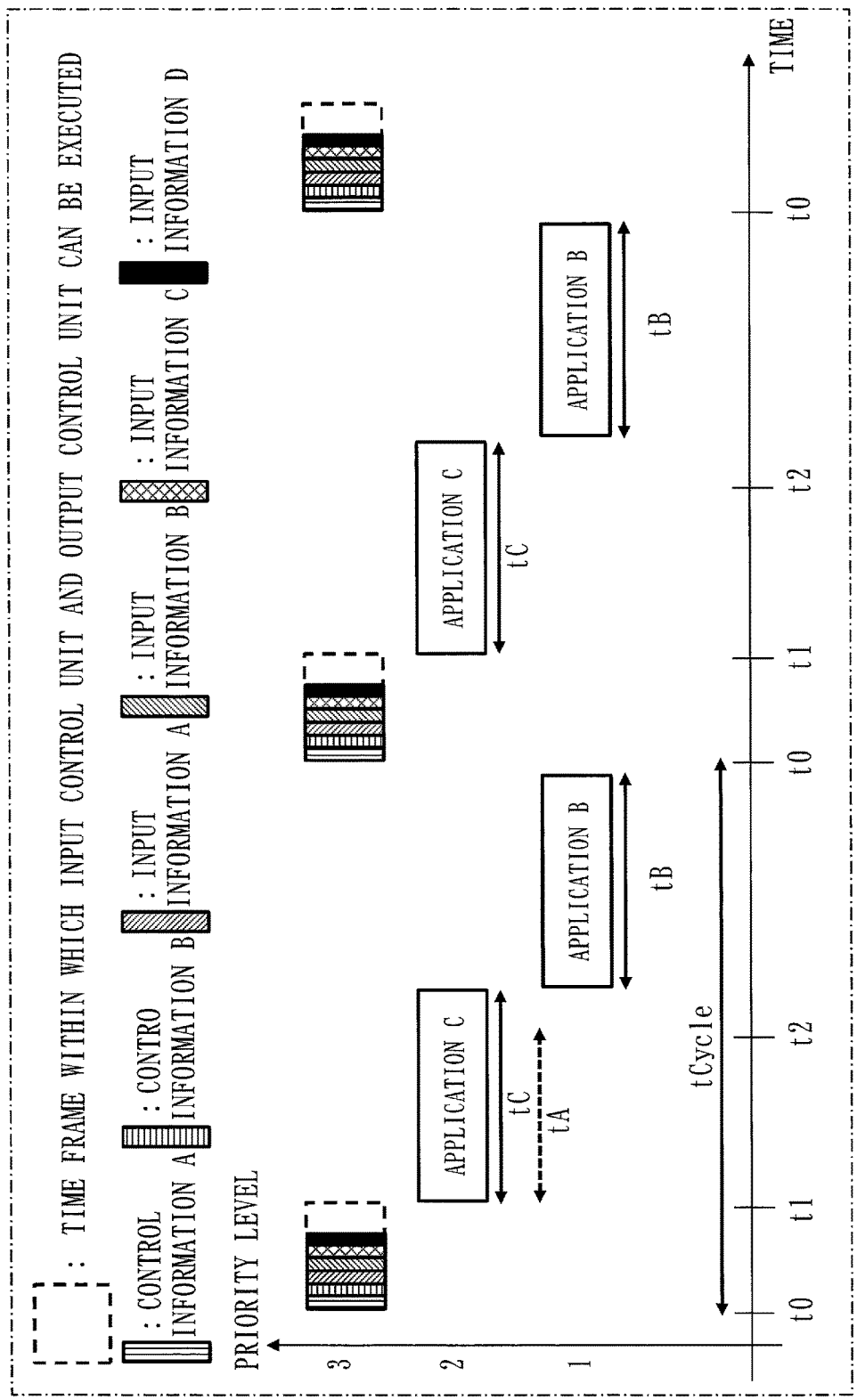
FIG. 11 is a timing chart after the update with the application C according to the first embodiment.

Subsequently, the application update determining unit 125 merges information in the parameter table 117 in FIG. 9 with the new application parameter information 124, as illustrated in FIG. 10. As a result, it is shown that all of the six pieces of information are at the same timing t0. Assume here that the value of NMax is 10. Since it is 6≤NMax, the application update determining unit 125 generates a timing chart as illustrated in FIG. 11 by using information of the startup condition 120 and the execution time 121 in FIG. 8, the parameter table 117 of FIG. 10, and information of the new application startup condition 122 and the new application execution time 123 to obtain the start time and the end time of each application. The timing chart of FIG. 11 is a timing chart in a case where the application C 112 is installed in the ECU 101, the application B 111 is executed according to the execution schedule of the application B 111, and the application C 112 is executed according to the execution schedule of the application C 112.

From the timing chart of FIG. 11, t the worst execution time of the application C 112 is a time tC, which is longer than the time t0 of the application A 110. Since, however, the end times of the application C 112 and the application B 111 are completed earlier than the next output timing t0, the application update determining unit 125 determines that the application A 110 can be updated by being overwritten with the application C 112 and terminates the processing.

*Description of Effects of Embodiment*

As described above, the server device 102 according to the present embodiment determines whether or not the input/output timings required of the input information and the control information to be used by the existing application B 111 and the new application C 112 are satisfied before update with the application C 112.

As a result, update of an application in the ECU 101 is performed only after the execution times and the input/output timings are confirmed to be satisfied, which allows the input information to be acquired from the sensors at the input timings intended by the developer of the application and the actuators to be controlled with the control information at the output timings intended by the developer.

As a result, such a situation in which the application C 112 or the existing application B 111 does not normally operate after the update is avoided.

In addition, the developer of the application C 112 need not have the information of the application B 111 during the development stage, but only needs to provide information of the input/output timings used during testing of the application C 112 as the timings guaranteeing normal operation of the application C 112 to the server device 102.

This eliminates the process of acquiring the information of the application B 111 and testing, which reduces the number of development man-hours. Thus, since verification of operation covering an enormous quantity of installation patterns need not be performed, the number of development man-hours for verification can be reduced.

Note that, in the present embodiment, information that can be placed at the same input/output timings are limited by the number (NMax) in step S503 in FIG. 7. Alternatively, the times taken for input of input information and output of control information may be obtained, and information that can be placed at the same input/output timings may be limited by the input/output times.

In addition, while the processing time of the OS 115 for starting and terminating applications and the like and the processing time when interrupt has occurred are not described in the present embodiment, the application update determining unit 125 may determine whether or not update is allowed in view of these processing times.

Second Embodiment

A vehicle network system according to a second embodiment will now be described.

Note that the description below will be made on differences from the first embodiment. The features that are not described below are the same as those in the first embodiment.

Since the configuration of the vehicle network system is the same as that in the first embodiment, the description of the same components will be omitted.

System information 116 according to the second embodiment is illustrated in FIG. 12.

As illustrated in FIG. 12, in the present embodiment, the startup cycles of the input control unit 113 and the output control unit 114 are tCycle/3.

In addition, in new application parameter information 124 included in the server device 102 in the second embodiment, the time of the input timing of control information D is set within a range from t3 to tCycle (=t0). Thus, the operation of the application C 112 is guaranteed even if the input timing of the input information D is time t3 or time t0. Assume here that time t3 is time at two-thirds of the time tCycle after start of the cycle of each application. In this manner, in the present embodiment, a time range is set for the input/output schedule of the application C 112.

In the present embodiment, in a case where time ranges are set for the input/output schedule of the application C 112 that is a non-installed application program, the application update determining unit 125 analyzes whether or not the input of the input information of the application C 112 and the output of the computation result of the application C 112 will be performed at timings within the time ranges of the input/output schedule of the application C 112 if the application C 112 is installed in the ECU 101 and the input of the input information of the application B 111 and the output of the computation result of the application B 111 are performed according to the input/output schedule of the application B 111.

Note that, in the present embodiment, the value of NMax is set to 5 in the application update determining unit 125.

Figure 13:
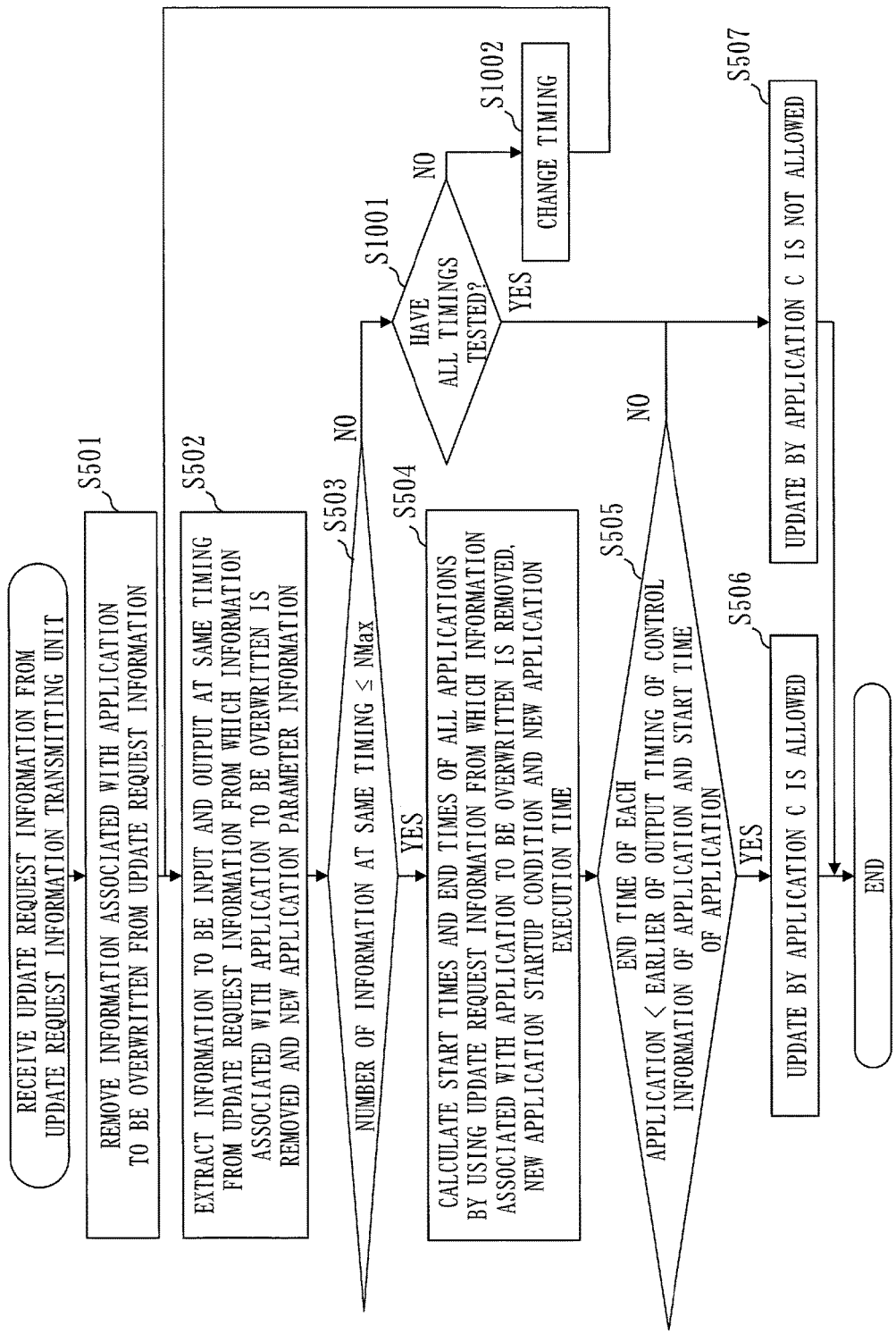
FIG. 13 is a flowchart illustrating example operation of a server device according to the second embodiment.

Next, processing performed when the application update determining unit 125 of the server device 102 has received update request information from the update request information transmitting unit 119 of the ECU 101 will be described with reference to a flowchart of FIG. 13. In FIG. 13, processes that are the same as those in FIG. 7 are represented by the same reference numerals, and the description thereof will be omitted.

If the number of pieces of input information and control information at the same timing is determined to exceed NMax (step S503), the application update determining unit 125 determines whether or not there is input information or control information which can be changed to an untested timing, among input information or control information at the timing whose number of pieces of information exceeds NMax (step S1001).

If there is no information which can be changed, the application update determining unit 125 determines that update of the ECU 101 with the application C 112 is not allowed (step S507), and terminates the processing.

If there is information which can be changed, the application update determining unit 125 changes the timing of the corresponding input information or control information (step S1002), and returns to step S502.

Next, only differences from the first embodiment in the determination process performed by the application update determining unit 125 when the ECU 101 has transmitted update request information to the server device 102 for the purpose of updating the application A 110 by overwriting with the application C 112 will be described.

Since the input/output timings of all the six pieces of information are the same timing t0, the value of NMax is 5, and 6>NMax, the application update determining unit 125 searches whether or not the timing of any of these six pieces of information can be changed. According to the new application parameter information 124, the input timing of the input information D can be selected from time t3 to tCycle (=t0). In addition, according to the startup condition 120 received from the ECU 101, the startup cycle of the input control unit 113 is ⅓ the length of tCycle. It is understood that the input control unit 113 can also be started on the ECU 101 and the input information D can be acquired and used for computation of the application C 112 at time t3 (=after two-thirds the length of tCycle from the start of the cycle). Thus, the application update determining unit 125 changes the timing of the input information D to time t3, and extracts information input and output at time t0 and time t3. In this case, the number of pieces of information at timing t0 is five and the number of pieces of information at timing t3 is one, and therefore the numbers of pieces of information input and output at time t0 and time t3 are equal to or less than NMax. Thus, update of the ECU 101 with the application C 112 is not determined to be not allowed, and the processing can proceed to the next step S504.

Figure 14:
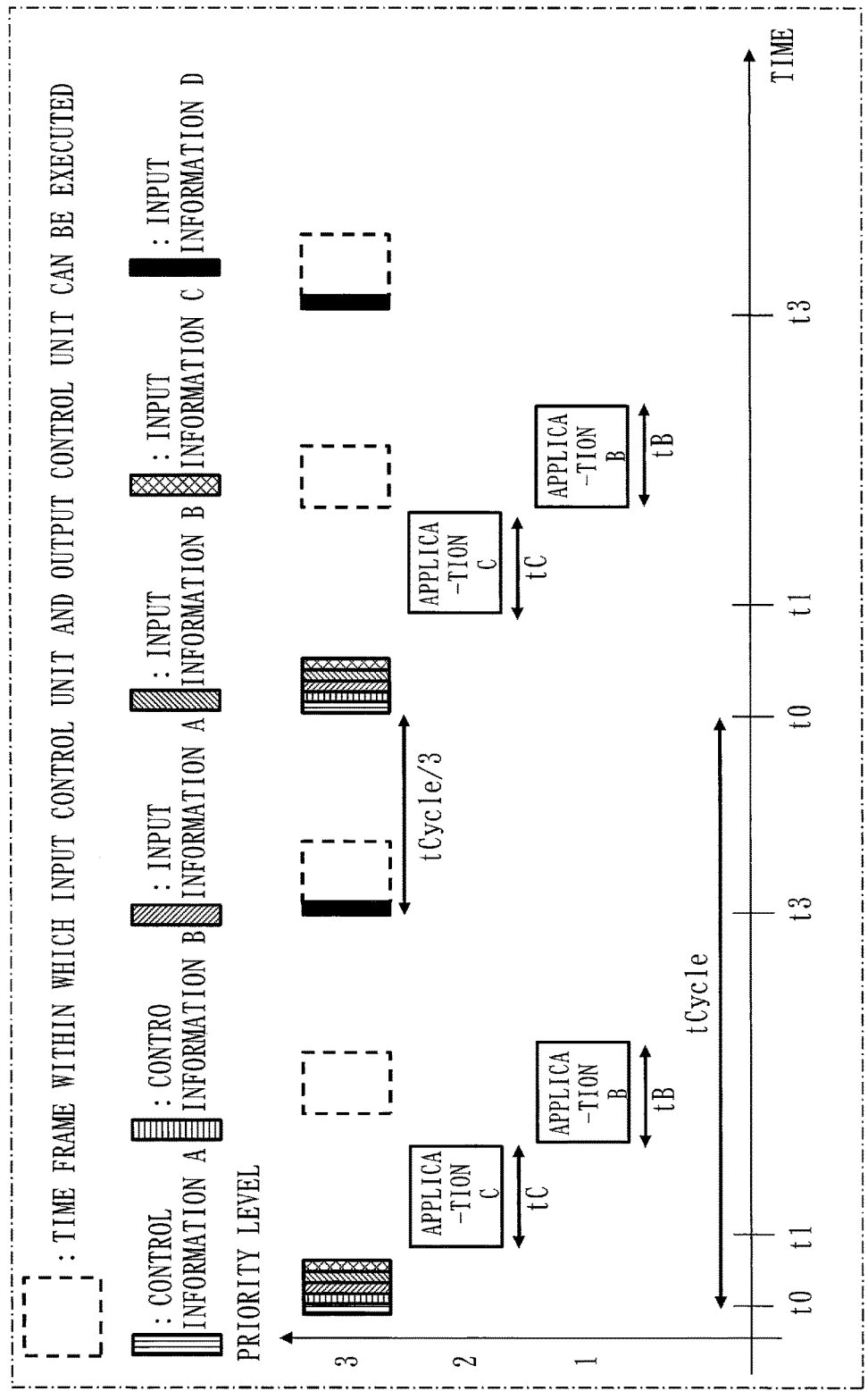
FIG. 14 is a timing chart after the update with an application C according to the second embodiment.

The operation of the ECU 101 in a case where the application A 110 is updated by being overwritten with the application C 112 in this manner will be described with reference to a timing chart in FIG. 14.

Since the time frame in which the input control unit 113 and the output control unit 114 started at time t0 can be executed is already used by five pieces of input information and control information, the input information D is acquired when the input control unit 113 is started at time t3. The application C 112 started at time t1 is to perform computation by using the values of the input information D acquired at the last time t3 and the input information A and the input information B acquired at the last time t0.

The input timing of the control information D is set in a time range and a plurality of input/output timings of information to be used by the application C 112 can be selected within the time range as described above, which makes the update of the application be more likely to be determined to be allowed than in the case where only one input timing is set, and improves the user-friendliness of application update.

In addition, it is guaranteed that the application C 112 operates normally even when the input information D acquired at time t3 is used, in the new application parameter information 124 of the application C 112. Thus, tests with the application B 111 and the application C 112 being installed need not be conducted, which reduces the number of development man-hours.

While the input timing of the input information included in the new application parameter information 124 is set in a time range in the second embodiment, the output timing of control information may be set in a time range in a case where the control information is included in the new application parameter information 124.

In addition, the input timing of input information and the output timing of control information included in the parameter table 117 of the ECU 101 may be set in a time range. For example, when a time range is set in the input/output schedule of the application B 111, the application update determining unit 125 analyzes whether or not the input of the input information of the application C 112 and the output of the computation result of the application C 112 will be performed according to the input/output schedule of the application C 112 if the application C 112 is installed in the ECU 101 and the input of the input information of the application B 111 and the output of the computation result of the application B 111 are performed at any timings within the time range of the input/output schedule of the application B 111.

In addition, while the input timing of the input information is set in a range in the second embodiment, the input timing of input information and the output timing of the control information may be set using a plurality of discrete values. In this case as well, the application update determining unit 125 operates as illustrated in FIG. 13.

Third Embodiment

A vehicle network system according to a third embodiment will now be described.

Note that the description below will be made on differences from the first embodiment. The features that are not described below are the same as those in the first embodiment.

Figure 15:
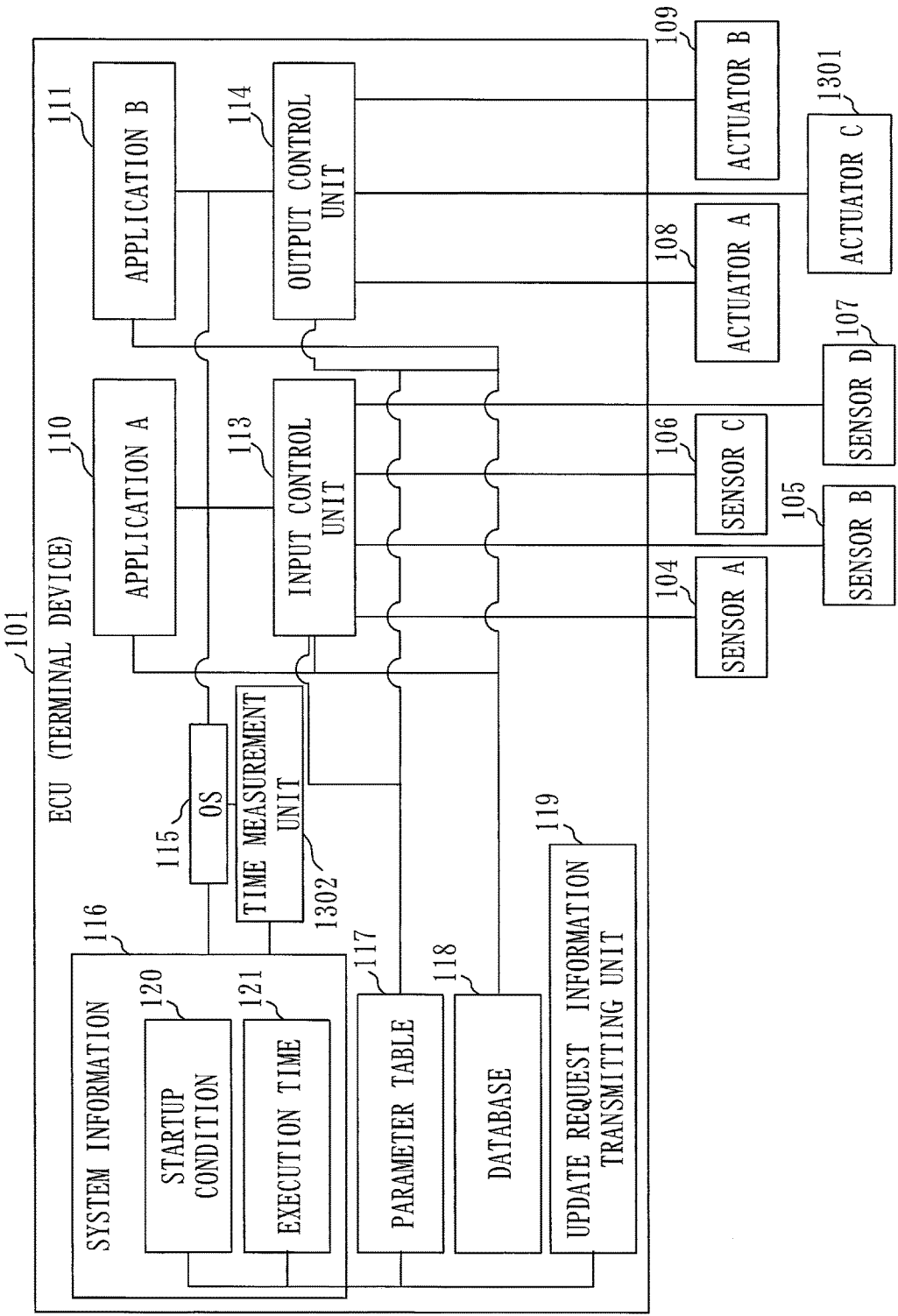
FIG. 15 is a diagram illustrating an example functional configuration of an ECU according to a third embodiment.

An example functional configuration of an ECU 101 according to the present embodiment is illustrated in FIG. 15.

In FIG. 15, components that are the same as those in FIG. 2 are represented by the same reference numerals.

The ECU 101 is connected with an actuator C 1301. In addition, the ECU 101 includes a time measurement unit 1302. Since the other components are the same as those in FIG. 2, the description thereof will be omitted.

In addition, the functional configuration of the server device 102 is the same as that in FIG. 3.

The system information 116 in an initial state according to the third embodiment is the same as that in FIG. 4.

A parameter table 117 according to the third embodiment is illustrated in FIG. 16. In FIG. 16, a row of control information C is added to FIG. 5; in the initial state, however, since no application to be used is present, no output timing is set.

The time measurement unit 1302 is realized by programs. The programs for realizing the time measurement unit 1302 are stored in the memory A 1803, and read and executed by the processor A 1804.

The time measurement unit 1302 measures the execution time of an application. More specifically, the time measurement unit 1302 starts measurement when the OS 115 starts an application, and stops measurement when processing of the application is terminated. The time measurement unit 1302 also compares the result of measurement of the execution time with information of the execution time 121 included in the system information 116.

If the measurement result is equal to or smaller than the value of the execution time 121 included in the system information 116, the measurement result is discarded. In contrast, if the measurement result is larger than the value of the execution time 121 of the system information 116, the time measurement unit 1302 updates the information of the execution time 121 of the system information 116 with the measurement result.

While the execution time 121 included in the system information 116 in the initial state is the worst execution time estimated during design, the worst execution time may be calculated to be shorter than an actual value owing to misestimation or the like. The execution time 121 is therefore updated with the measurement result by the time measurement unit 1302.

In the present embodiment, the application C 112 is an application for implementing functions different from those of the application A 110 and the application B 111. Thus, when the application C 112 is installed in the ECU 101, the application A 110 or the application B 111 is not overwritten with the application C 112 but the application C 112 is newly added to the ECU 101.

When the application C 112 is started at the ECU 101, the application C 112 performs computation by using the input information A, the input information B, and the input information D stored in the database 118 to calculate the control information C, and stores the control information C into the database 118.

The new application startup condition 122 is information to be used as the startup condition 120 by the OS 115 in the case where the application C 112 is executed by the ECU 101. Herein, the priority level is 0, the startup cycle is tCycle, and the startup offset is a time t0.

The new application execution time 123 is an estimated value of the worst execution time in the case where the application C 112 is executed by the ECU 101, and is represented by a time tD.

The new application parameter information 124 is information specifying the input timings of the input information A, the input information B, and the input information D to be used by the application C 112, the output timing of the control information C, the respective devices and the respective directions. It is guaranteed that normal vehicle control will be made by the application C 112 when input and output are performed at the input/output timings of the new application parameter information 124. It is assumed herein that the input/output timings are all set to time to.

Figure 17:
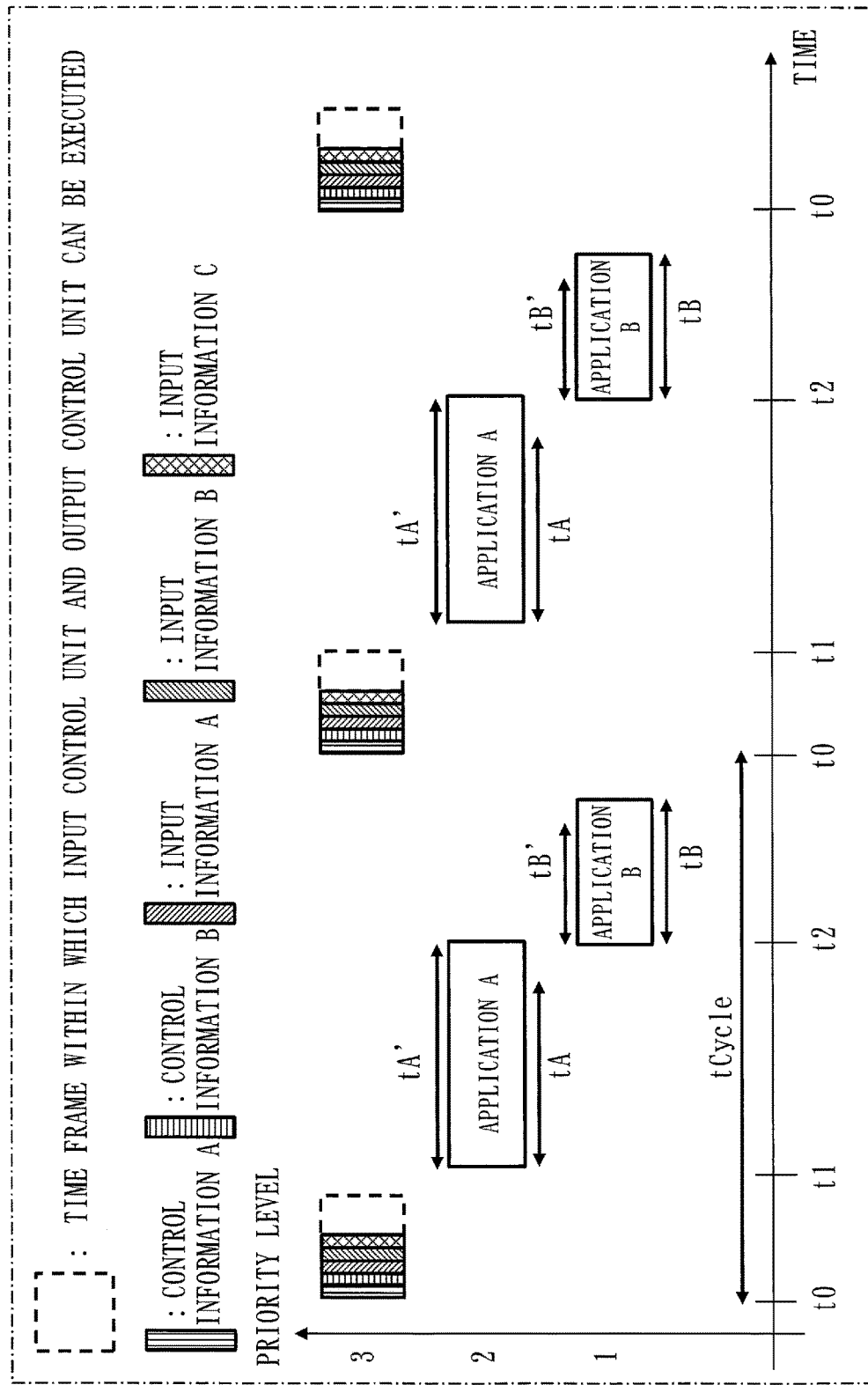
FIG. 17 is a timing chart before update with an application C according to the third embodiment.

Next, the operation of the ECU 101 before the application C 112 is added will be described with reference to a timing chart in FIG. 17. In FIG. 17, description of parts that are the same as those in FIG. 6 will be omitted.

At time t1, the OS 115 starts the application A 110 on the basis of the startup condition 120. The time measurement unit 1302 then starts measurement of the execution time.

Subsequently, when the application A 110 terminates the processing at time t2, the time measurement unit 1302 terminates the measurement of the execution time, and compares the result of measurement of the execution time with the value of the execution time 121 included in the system information 116. Herein, the result of measurement of the execution time tA' (=t241) is assumed to be longer than the execution time tA included in the system information 116. Thus, the time measurement unit 1302 updates the value of the execution time 121 of the system information 116 with tA' as illustrated in FIG. 18 and terminates the processing.

Since the result of measurement of the execution time tB' of the application B 111 subsequently started at time t2 is shorter than the execution time tB of the system information 116, the execution time tB of the system information 116 is not updated.

The processing performed by the application update determining unit 125 of the server device 102 upon receiving update request information from the update request information transmitting unit 119 of the ECU 101 is the same as that in FIG. 7. Thus, in the present embodiment, update request information indicating the execution time tA' measured by the time measurement unit 1302 as the execution time of the application A 110 is received, and whether or not to allow update of the application C 112 is determined with use of the execution time tA'.

Next, a determination process performed by the application update determining unit 125 when the ECU 101 has transmitted update request information to the server device 102 for the purpose of updating by adding the application C 112 after the execution time 121 of the system information 116 is updated, will be described.

Upon receiving update request information illustrated in FIGS. 16 and 18 from the ECU 101 as the update request information, the application update determining unit 125 does not delete information received from the ECU 101 since no application is to be overwritten. In addition, the application update determining unit 125 merges information in the parameter table 117 in FIG. 16 with the new application parameter information 124. As a result, the application update determining unit 125 determines that all of the six pieces of information are at the same timing t0 and that it is 6≤NMax (=10).

Subsequently, the application update determining unit 125 generates a timing chart illustrated in FIG. 19, by using the information of the execution time 121 of the startup condition 120 in FIG. 18, the parameter table 117 in FIG. 16, the information of the new application startup condition 122 and the new application execution time 123, and the new application parameter information 124. The application update determining unit 125 also obtains start times and end times of applications from the generated timing chart.

As a result, since the end time of the application C 112 is later than the output timing t0 of the control information C output by the application C 112, the application update determining unit 125 determines that update by adding the application C 112 is not allowed and terminates the processing.

Figure 19:
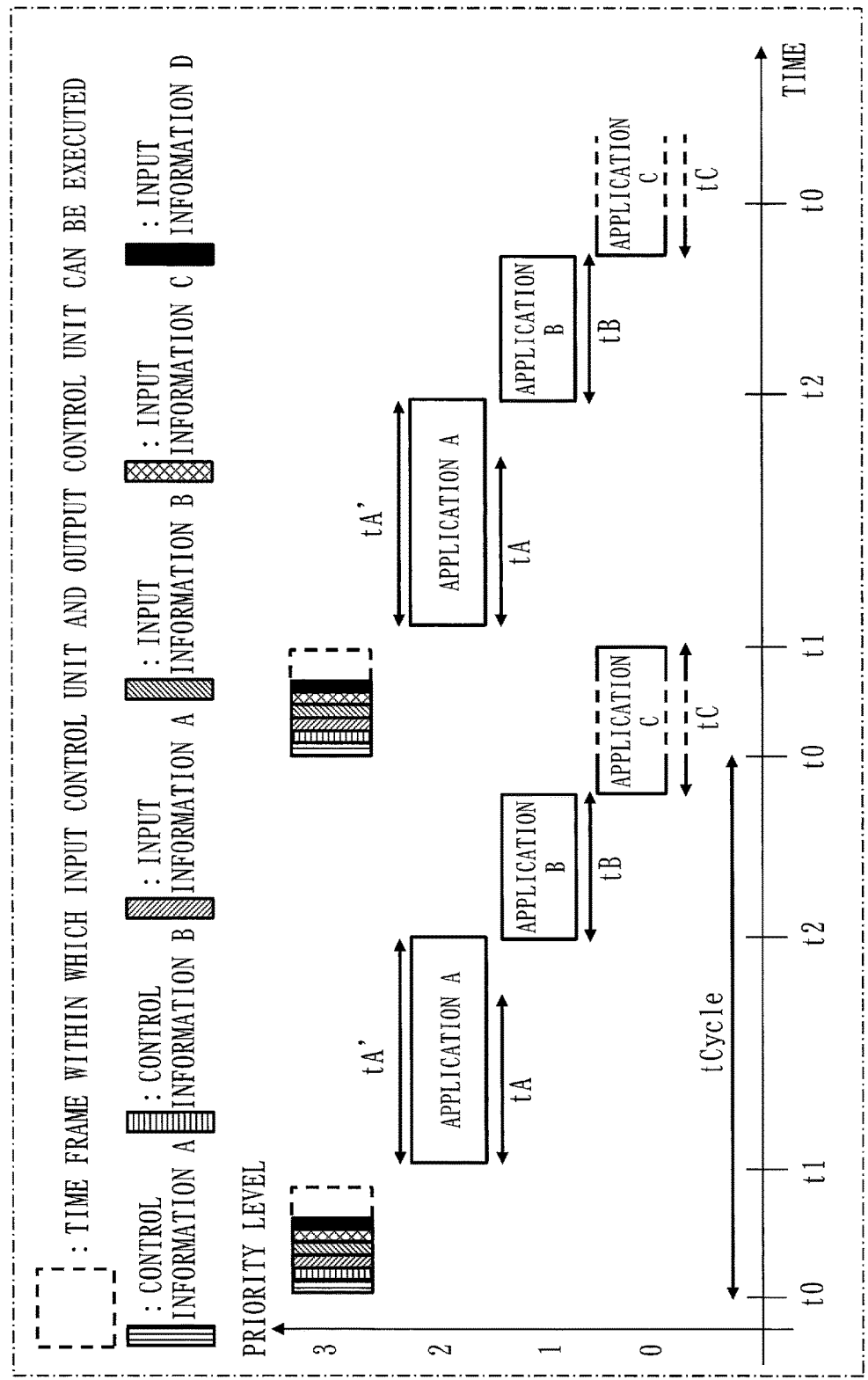
FIG. 19 is a timing chart after the update with the application C according to the third embodiment.

As is clear from the timing chart of FIG. 19, the application C 112 can also be executed after processing of the output control unit 114 and the input control unit 113 is terminated at time t0 until the application A 110 is started at time t1. Thus, when determination is made only in terms of extra time (idle time) of the execution time, the update can be determined to be allowed. If, however, update by the addition is performed without the output timing taken into consideration in this manner, control of the actuator C 1301 with the control information C output by the application C 112 is to be performed after the next application C 112 is started. The control timing is therefore delayed by approximately one cycle (tCycle), and the output will not be at the timing intended by the developer of the application C 112. Thus, normal operation of the ECU 101 cannot be guaranteed, and advanced vehicle control may not be performed. The determination on whether or not update of an application is allowed needs to be performed not only in view of whether or not there is extra time for the execution time 121 but also in view of the input/output timings as in the present embodiment.

In other words, the application update determining unit 125 determines whether or not executions of the application A 110, the application B 111, and the application C 112 will be completed by the output timings of the respective control information if the application A 110, the application B 111, and the application C 112 are executed according to execution schedules. If the executions of the application A 110, the application B 111, and the application C 112 will not be completed by the output timings of the respective control information, the application update determining unit 125 does not allow installation of the application C 112 into the ECU 101.

In addition, if the determination on whether or not to allow update of an application is made using the execution time t0 of the system information 116 in the initial state, the application update determining unit 125 will estimate the execution time of the application A 110 to be shorter than the actual execution time and make the determination. The application update determining unit 125 may thus determine that the end time of the application C 112 is earlier than the output timing of the control information C, and may erroneously determine that the application C 112 can be added. In a case where the result of measurement of the execution time of an application at the ECU 101 is longer than the worst execution time estimated during design, use of the measurement result as the execution time 121 as in the present embodiment allows the determination on whether or not addition of the application is allowed to be made with high accuracy, as in the present embodiment. As a result, such a situation in which the application does not operate normally in the ECU 101 after addition of the application is avoided.

*Description of Hardware Configuration*

Finally, supplementary explanation of the hardware configurations of the ECU 101 and the server device 102 will be provided.

The processor A 1804 and the processor B 1807 illustrated in FIG. 1 are integrated circuits (ICs) to perform processing.

The processor A 1804 and the processor B 1807 are central processing units (CPUs), digital signal processors (DSPs) or the like.

The memory A 1803 and the memory B 1806 are random access memories (RAMs), read only memories (ROMs), flash memories, hard disk drives (HDDs), or the like.

The transmission/reception interface A 1805 and the transmission/reception interface B 1808 each include a receiver to receive data and a transmitter to transmit data.

The transmission/reception interface A 1805 and the transmission/reception interface B 1808 are communication chips or network interface cards (NICs), for example.

In addition, in the ECU 101, information, data, signal values, and variable values indicating results of processing of the application A 110, the application B 111, the input control unit 113, the output control unit 114, the OS 115, the update request information transmitting unit 119, and the time measurement unit 1302 are stored in the memory A 1803 or in a register or a cache memory in the processor A 1804.

Furthermore, programs to realize the application A 110, the application B 111, the input control unit 113, the output control unit 114, the OS 115, the update request information transmitting unit 119, and the time measurement unit 1302 may be stored in a portable storage medium such as a magnetic disk, a flexible disk, an optical disk, a compact disk, a Blu-ray (registered trademark) disk, or a DVD.

Similarly, in the server device 102, information, data, signal values, and variable values indicating results of processing of the application update determining unit 125 are stored in the memory B 1806, or a register or a cache memory in the processor B 1807. Furthermore, programs to realize the application update determining unit 125 may be stored in a portable storage medium such as a magnetic disk, a flexible disk, an optical disk, a compact disk, a Blu-ray (registered trademark) disk, or a DVD.

Alternatively, the ECU 101 and the server device 102 may be realized by electronic circuits such as logic integrated circuits (ICs), gate arrays (GAs), application specific integrated circuits (ASICs), or field-programmable gate arrays (FPGAs).

Note that the processors and the electronic circuits may be collectively referred to as processing circuitry.

*Additional Statement*

Some embodiments of the present invention have been described above; two or more of the embodiments may be combined.

Alternatively, one of the embodiments may be partially carried out.

Alternatively, two or more of the embodiments may be partially combined.

Note that the present invention is not limited to the embodiments, but various modifications may be made thereto where necessary.

In addition, while update of an application at the ECU has been described above, the present invention can also be applied to update of an application at a device other than the ECU as long as the application can be executed.

REFERENCE SIGNS LIST

101: ECU, 102: server device, 103: radio communication network, 104: sensor A, 105: sensor B, 106: sensor C, 107: sensor D, 108: actuator A, 109: actuator B, 1301: actuator C, 110: application A, 111: application B, 112: application C, 113: input control unit, 114: output control unit, 115: OS, 116: system information, 117: parameter table, 118: database, 119: update request information transmitting unit, 120: startup condition, 121: execution time, 122: new application startup condition, 123: new application execution time, 124: new application parameter information, 125: application update determining unit, 1302: time measurement unit, 1801: sensor interface, 1802: actuator interface, 1803: memory A, 1804: processor A, 1805: transmission/reception interface A, 1806: memory B, 1807: processor B, 1808: transmission/reception interface B

The invention claimed is:

1. An information processing method comprising:
receiving, from a terminal device, installed application information indicating an input/output schedule of input of input information to be used for computation by an installed application program installed in the terminal device and output of a result of computation by the installed application program and an execution schedule of the installed application program in the terminal device;
analyzing, using the input/output schedule of the installed application program and the execution schedule of the installed application program indicated by the installed application information and an input/output schedule of input of input information to be used for computation by a non-installed application program not yet installed in the terminal device and output of a result of computation by the non-installed application program, whether or not input of input information of the non-installed application program and output of a result of computation by the non-installed application program are to be performed according to the input/output schedule of the non-installed application program, if the non-installed application program is installed in the terminal device and input of input information of the installed application program and output of a result of computation by the installed application program are performed according to the input/output schedule of the installed application program;
analyzing whether or not execution of the installed application program and execution of the non-installed application program are to be completed within a predetermined time frame, if the non-installed application program is installed in the terminal device, the installed application program is executed according to the execution schedule of the installed application program, and the non-installed application program is executed according to the execution schedule of the non-installed application program; and
determining that the installed application program and the non-installed application program can be executed by the terminal device, if the input of the input information of the non-installed application program and the output of the result of computation by the non-installed application program are to be performed according to the input/output schedule of the non-installed application program and the execution of the installed application program and the execution of the non-installed application program are to be completed within the time frame.

2. A non-transitory computer readable medium storing an information processing program causing a computer to execute:
receiving, from a terminal device, installed application information indicating an input/output schedule of input of input information to be used for computation by an installed application program installed in the terminal device and output of a result of computation by the installed application program and an execution schedule of the installed application program in the terminal device;
analyzing, using the input/output schedule of the installed application program and the execution schedule of the installed application program indicated by the installed application information and an input/output schedule of input of input information to be used for computation by a non-installed application program not yet installed in the terminal device and output of a result of computation by the non-installed application program, whether or not input of input information of the non-installed application program and output of a result of computation by the non-installed application program are to be performed according to the input/output schedule of the non-installed application program, if the non-installed application program is installed in the terminal device and input of input information of the installed application program and output of a result of computation by the installed application program are performed according to the input/output schedule of the installed application program;
analyzing whether or not execution of the installed application program and execution of the non-installed application program are to be completed within a predetermined time frame, if the non-installed application program is installed in the terminal device, the installed application program is executed according to the execution schedule of the installed application program, and the non-installed application program is executed according to the execution schedule of the non-installed application program; and
determining that the installed application program and the non-installed application program can be executed by the terminal device, if the input of the input information of the non-installed application program and the output of the result of computation by the non-installed application program are to be performed according to the input/output schedule of the non-installed application program and the execution of the installed application program and the execution of the non-installed application program are to be completed within the time frame.

3. An information processing device comprising:
processing circuitry;
a memory storing a program that is read and executed by the processing circuitry to:
receive, from a terminal device, installed application information indicating an input/output schedule of input of input information to be used for computation by an installed application program installed in the terminal device and output of a result of computation by the installed application program and an execution schedule of the installed application program in the terminal device; and
analyze, using the input/output schedule of the installed application program and the execution schedule of the installed application program indicated by the installed application information and an input/output schedule of input of input information to be used for computation by a non-installed application program not yet installed in the terminal device and output of a result of computation by the non-installed application program, whether or not input of input information of the non-installed application program and output of a result of computation by the non-installed application program are to be performed according to the input/output schedule of the non-installed application program, if the non-installed application program is installed in the terminal device and input of input information of the installed application program and output of a result of computation by the installed application program are performed according to the input/output schedule of the installed application program;

analyze whether or not execution of the installed application program and execution of the non-installed application program are to be completed within a predetermined time frame, if the non-installed application program is installed in the terminal device, the installed application program is executed according to the execution schedule of the installed application program, and the non-installed application program is executed according to the execution schedule of the non-installed application program; and determine that the installed application program and the non-installed application program can be executed by the terminal device, if the input of the input information of the non-installed application program and the output of the result of computation by the non-installed application program are to be performed according to the input/output schedule of the non-installed application program and the execution of the installed application program and the execution of the non-installed application program are to be completed within the time frame.

4. The information processing device according to claim 3, wherein the processing circuitry receives the installed application information indicating a timing when the installed application program is to be executed and an execution time measured when the installed application program has been executed by the terminal device, as the execution schedule of the installed application program in the terminal device.

5. The information processing device according to claim 3, wherein the processing circuitry transmits the non-installed application program to the terminal device when the processing circuitry has determined that the installed application program and the non-installed application program can be executed by the terminal device.

* * * * *